United States Patent [19]
Tanigawa et al.

[11] Patent Number: 5,744,081
[45] Date of Patent: Apr. 28, 1998

[54] BUILDING MATERIAL MANUFACTURING METHOD

[75] Inventors: Masanori Tanigawa; Kazuhiko Mitoma; Shusuke Matsumura, all of Osaka, Japan

[73] Assignee: Matsushita Electric Works, Ltd., Osaka, Japan

[21] Appl. No.: 664,619

[22] Filed: Jun. 18, 1996

[30] Foreign Application Priority Data

Jun. 19, 1995 [JP] Japan ................................ 7-152085
Jun. 19, 1995 [JP] Japan ................................ 7-152086

[51] Int. Cl.$^6$ ................................................. B29C 33/38
[52] U.S. Cl. .................. 264/219; 264/40.1; 364/475.02
[58] Field of Search ................................ 264/219, 225, 264/220, 40.1; 364/475.02

[56] References Cited

U.S. PATENT DOCUMENTS

| | | | |
|---|---|---|---|
| 4,832,966 | 5/1989 | Newsteder | 264/219 |
| 5,071,597 | 12/1991 | D'Amato et al. | 264/219 |
| 5,231,749 | 8/1993 | Hutchison | 264/219 |
| 5,439,622 | 8/1995 | Pennisi et al. | 264/219 |

FOREIGN PATENT DOCUMENTS 3-295700  12/1996  Japan.

Primary Examiner—Mathieu D. Vargot
Attorney, Agent, or Firm—Sughrue, Mion, Zinn, Macpeak & Seas, PLLC

[57] ABSTRACT

In a method of manufacturing a building material, three-dimensional data on a surface pattern selected are obtained and stored, an image based on two-dimensional data of the three-dimensional data is displayed on a screen, and shaped, and an image which is obtained by adding height data of the three-dimensional data to the image thus shaped is displayed on the screen, and evaluated, pieces extracted from the image thus evaluated are shaped and arranged at predetermined positions, the height data of the pieces thus arranged is cut to a predetermined value thereby to process a miniature size model image, the miniature size model image is displayed on the screen, and evaluated, the miniature size model selected through evaluation is arranged at predetermined positions to process a full size model image, a building material model is formed according to the three-dimensional data of the full size model, and evaluated, a metal mold is formed according to three-dimensional data corresponding to the building material model thus evaluated, and a building material is formed by use of the metal mold.

7 Claims, 14 Drawing Sheets

FIG. 4
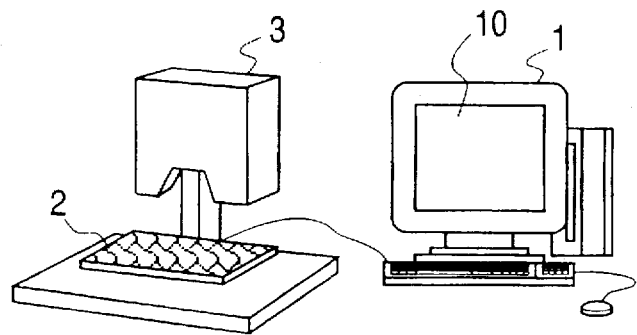
FIG. 5
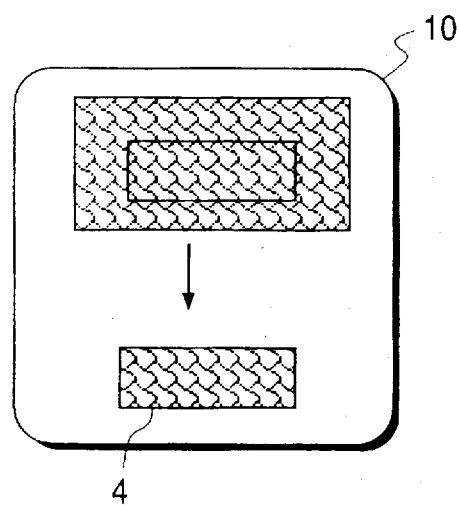
FIG. 6(a)    FIG. 6(b)    FIG. 6(c)
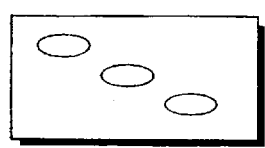 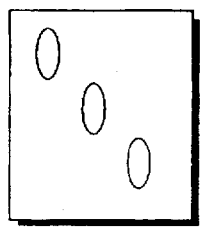 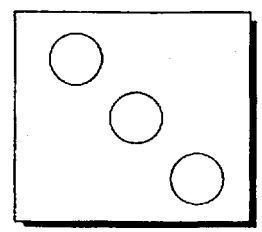

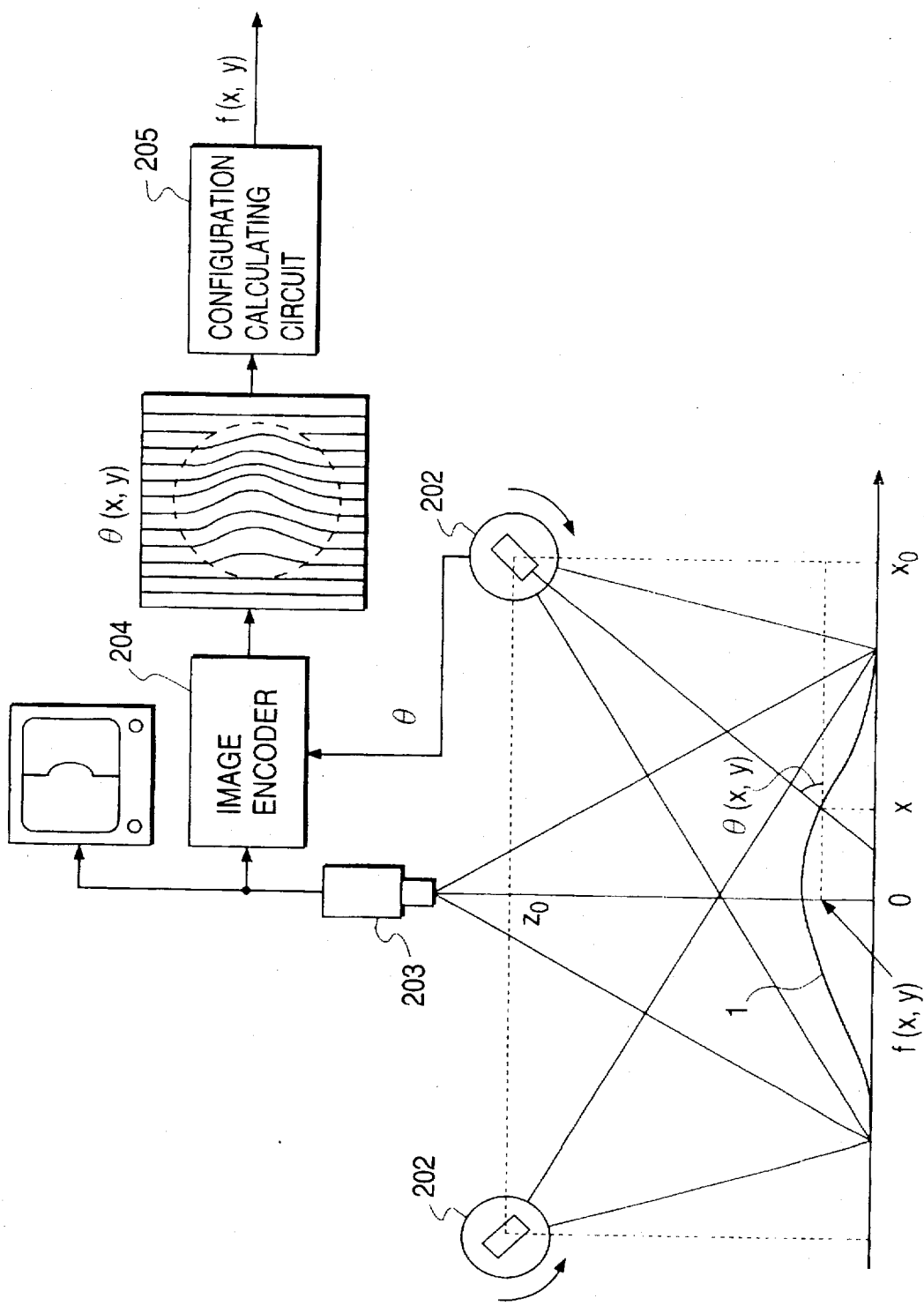

FIG. 24(a)
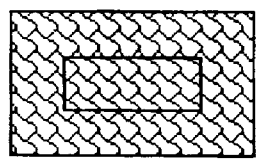
FIG. 24(b)
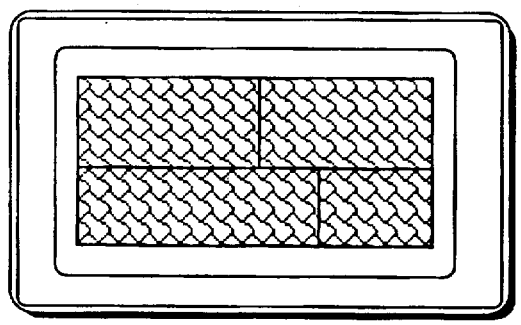

BUILDING MATERIAL MANUFACTURING METHOD

BACKGROUND OF THE INVENTION

1. Field of the Invention

This invention relates to a method of manufacturing building materials such as interior building materials and exterior building materials.

2. Related Art

A variety of building materials are available which are different in surface pattern (or texture) from one another. Heretofore, selection and formation of the textures are carried out only from the viewpoint of two-dimensional, planar appearance.

Therefore, textures imitating various patterns present in the natural world such sandstone surface patterns, grain patterns and bark patterns are far in visual resemblance from the patterns of the corresponding real ones.

In view of the foregoing, an object of the invention is to provide a method of manufacturing building materials whose textures are very close in visual resemblance to the patterns of the corresponding real ones, and which can be manufactured with high efficiency.

SUMMARY OF THE INVENTION

The foregoing object of the invention has been achieved by the provision of a method of manufacturing an exterior or interior building material whose surface are made uneven as a pattern, which, according to the invention, comprises:

- a first step of obtaining and storing three-dimensional data on a surface pattern selected;
- a second step of displaying on a screen an image based on two-dimensional data of the three-dimensional data, and shaping the image thus displayed, and displaying on the screen an image which is obtained by adding height data of the three-dimensional data to the image thus shaped, and subjecting the image thus displayed to evaluation;
- a third step of arranging at predetermined positions pieces extracted from the image thus shaped and evaluated;
- a fourth step of reducing height data of the pieces thus arranged to a predetermined value, to form flat regions, thereby to process a miniature size model image;
- a fifth step of displaying the miniature size model image on the screen, and subjecting the image to evaluation;
- a sixth step of arranging the miniature size models selected through evaluation at predetermined positions to process a full size model image;
- a seventh step of forming a building material model according to three-dimensional data of the full size model, and evaluating the building material model thus formed;
- an eighth step of forming a metal mold according to three-dimensional data corresponding to the building material model thus evaluated; and
- a ninth step of forming a building material by use of the metal mold.

In the method, the external configuration and size of the miniature size model may be defined by joints of the building materials. It is preferable that the second step is repeatedly carried out to obtain a plurality of desired pieces, and the pieces thus obtained are laid out to form the miniature size model.

Moreover, it is preferable that a miniature size building material is formed according to three-dimensional data corresponding to the miniature size model which is evaluated in the fourth step, and evaluated, and then the sixth step is effected.

Furthermore, it is preferable that in the method, instead of the eighth step, a miniature size metal mold is formed according to three-dimensional data corresponding to a miniature size model which is evaluated in the fifth step, and a plurality of the miniature size metal molds thus formed are arranged according to a full size model, to obtain a building material metal mold, and that, instead of the eighth step, a miniature size casting model is formed according to three-dimensional data corresponding to the miniature size model which is evaluated in the fifth step, and the casting model is used to form a full size model casting model, and the full size model casting model is utilized to form a building material metal mold.

In the method of the invention, at the CAD and CAM work station, the operator can push forward with the designing of an exterior or interior building materials having uneven surface patterns as well as the formation of metal molds while watching the images of building materials to be formed.

In this connection, the external configuration and dimensions of the miniature size model is defined with the joints of the building material. This feature makes it possible to improve the work efficiency in the manufacture of building materials, and to suitably evaluate the resultant surface patterns thus designed.

A plurality of desired pieces can be obtained by repeating the above-described second step. And by laying out those pieces, a miniature size model can be formed, which results in the provision of a more suitable building material.

A miniature size building material is formed according to three-dimensional data corresponding to a miniature size model which is evaluated in the fifth step, and is then evaluated. Thereafter, the sixth step is effected. In this case, during designing, the evaluation of the surface pattern can be carried out more effectively.

Instead of the eighth step, a miniature size metal mold may be formed according to three-dimensional data corresponding to a miniature size model which is evaluated in the fifth step. In this case, a plurality of the miniature size metal molds thus formed are arranged according to a full size model, to obtain a building material metal mold. Alternatively, a miniature size casting model may be formed according to three-dimensional data corresponding to the miniature size model which is evaluated in the fifth step. In this case, the casting model is used to form a full size model casting model, and the full size model casting model is utilized to form a building material metal mold. Those methods make it possible to form the building material metal mold with ease.

BRIEF DESCRIPTION OF THE DRAWING(S)

FIG. 4 is an explanatory diagram for a description of the obtaining of three-dimensional data from a specimen in the method of the invention.

FIG. 5 is an explanatory diagram for a description of how to take a piece out of a given image in a pattern processing step in the method of the invention.

FIGS. 6(a)–6(c) shows the enlargement and shrinkage of the piece. More specifically, FIG. 6(a) is an explanatory diagram for a description of the enlargement and shrinkage of the piece in the direction x, and FIG. 6(b) is an explanatory diagram for a description of the enlargement and shrinkage of the piece in the direction y, and FIG. 6(c) is also an explanatory diagram for a description of the enlargement and shrinkage of the piece in the direction x–y in the pattern processing step.

Figure 7A:
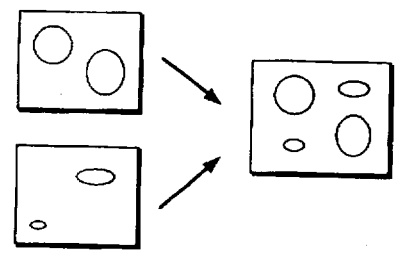
Figure 7B:
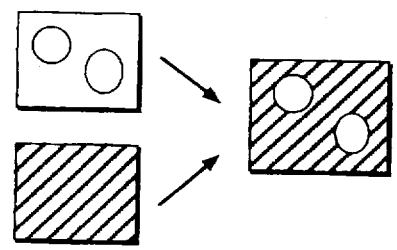

FIGS. 7(a)–7(b) are explanatory diagrams for a description of the combinations of the pieces in the pattern shaping step.

Figure 8:
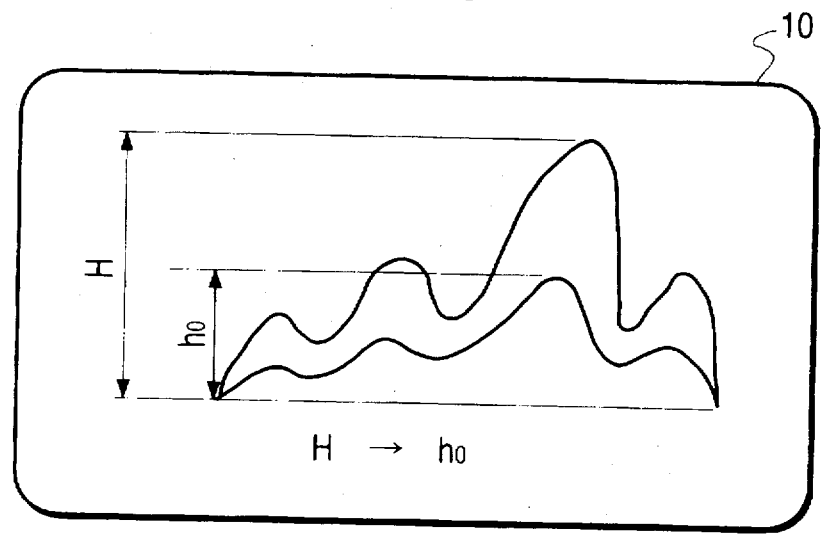

FIG. 8 is an explanatory diagram for a description of the adjustment of height data in the pattern processing step.

Figure 9:
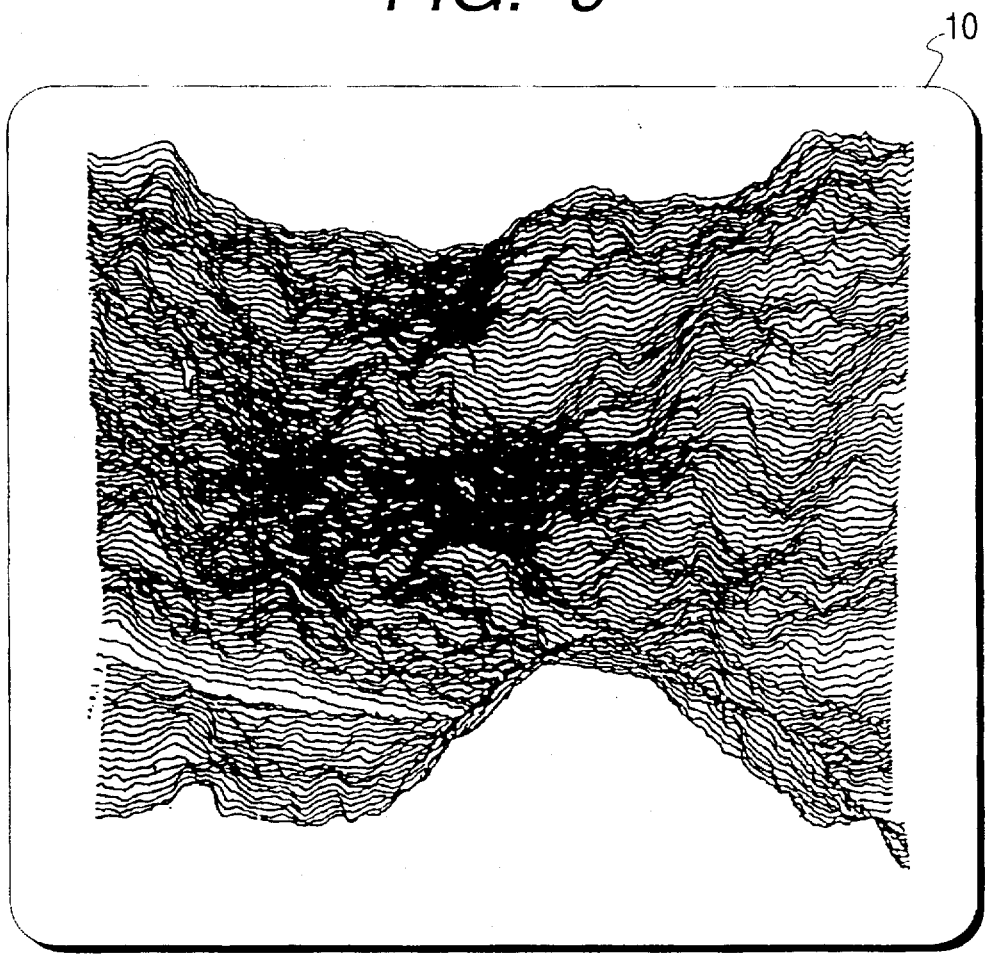

FIG. 9 is an explanatory diagram for a description of an example of a three-dimensional image displayed on the screen in the pattern processing step.

Figure 10:
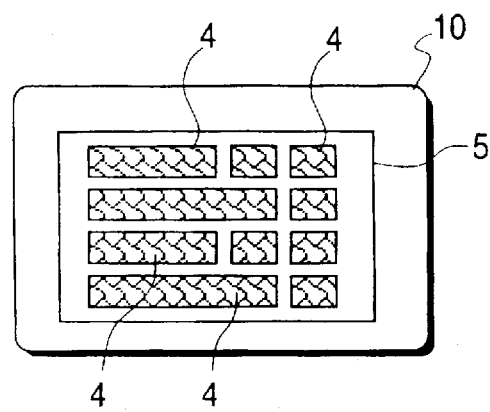

FIG. 10 is an explanatory diagram for a description of the lay-out of the pieces.

Figure 11:
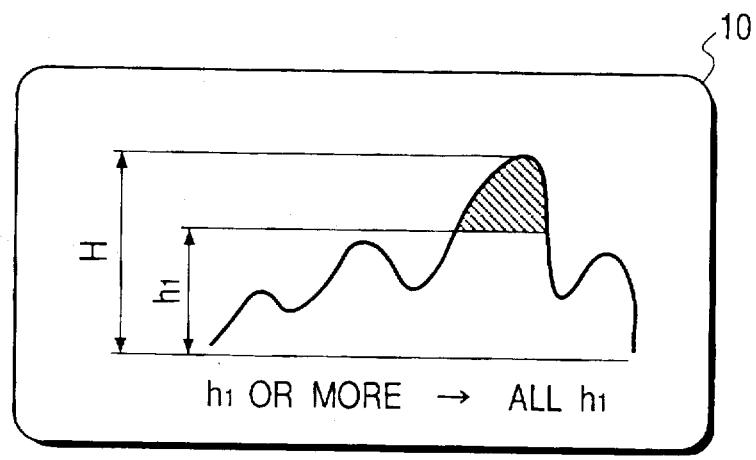

FIG. 11 is an explanatory diagram for a description of the removal of a part of the height data in the pattern processing step.

Figure 12:
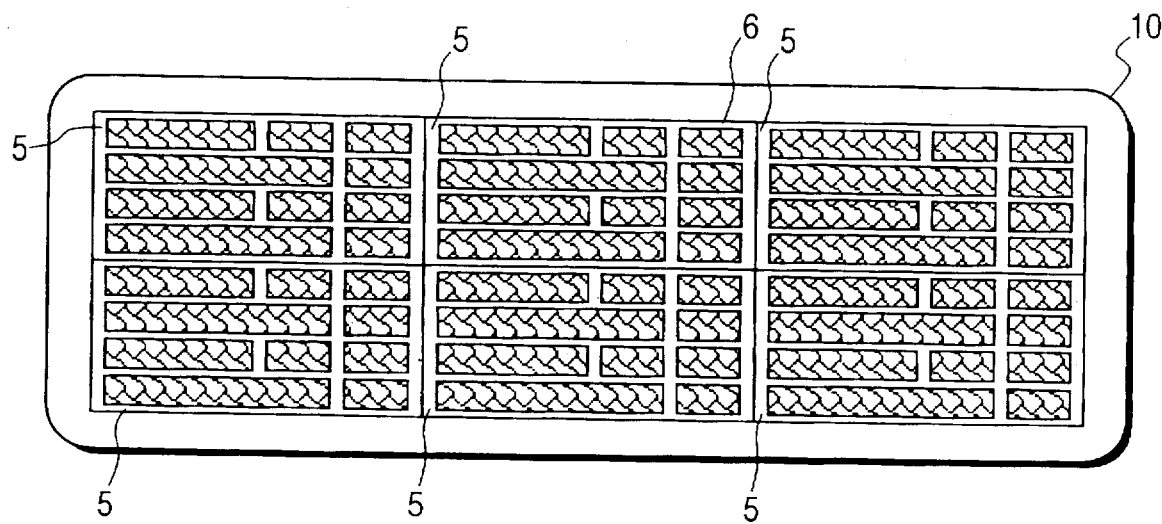

FIG. 12 is an explanatory diagram showing a full size model in the method of the invention.

Figure 13:
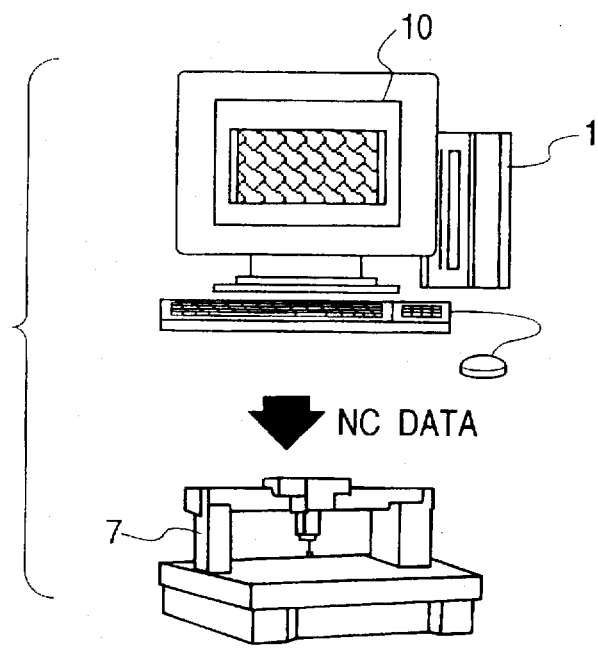

FIG. 13 is an explanatory diagram for a description of the formation of a metal mold in the method of the invention.

Figure 14:
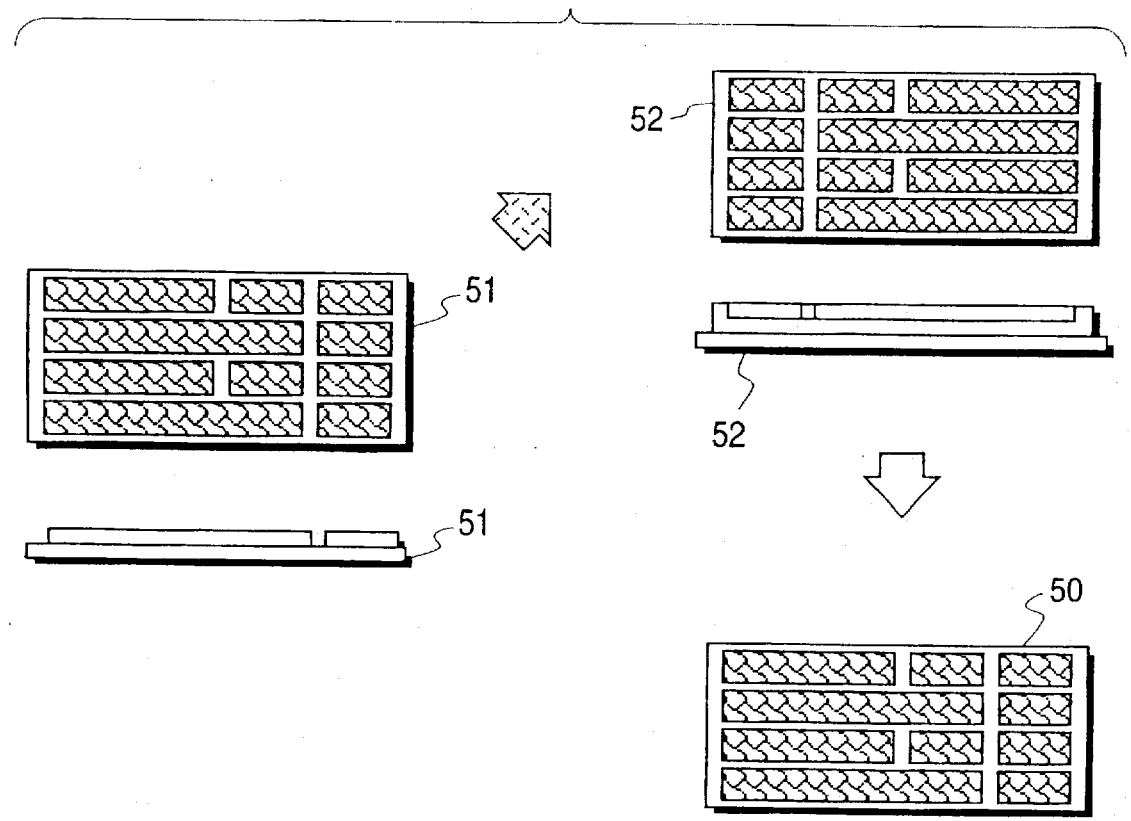

FIG. 14 is an explanatory diagram for a description of the formation of a miniature size building material in the method of the invention.

Figure 15:
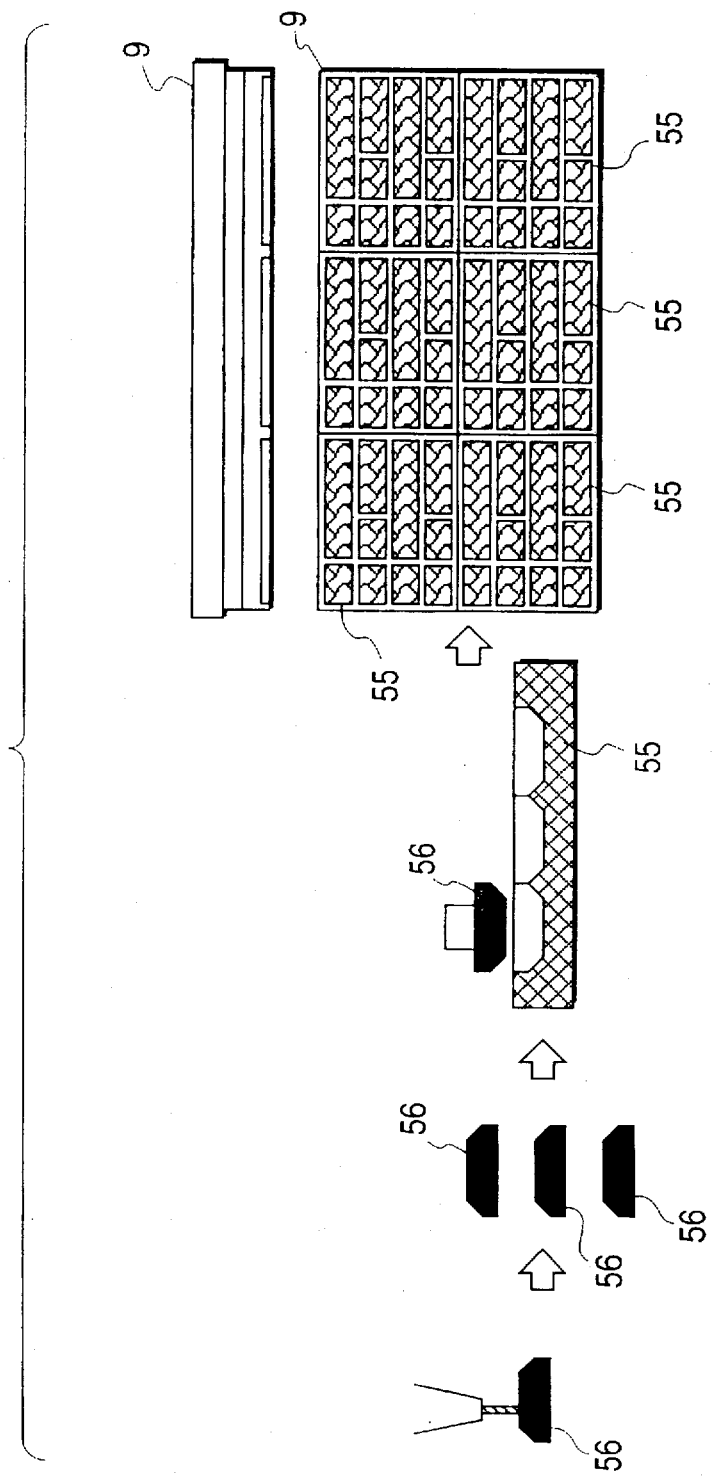

FIG. 15 is an explanatory diagram for a description of the formation of a metal mold with the aid of miniature size metal molds in a second embodiment of the invention.

Figure 16:
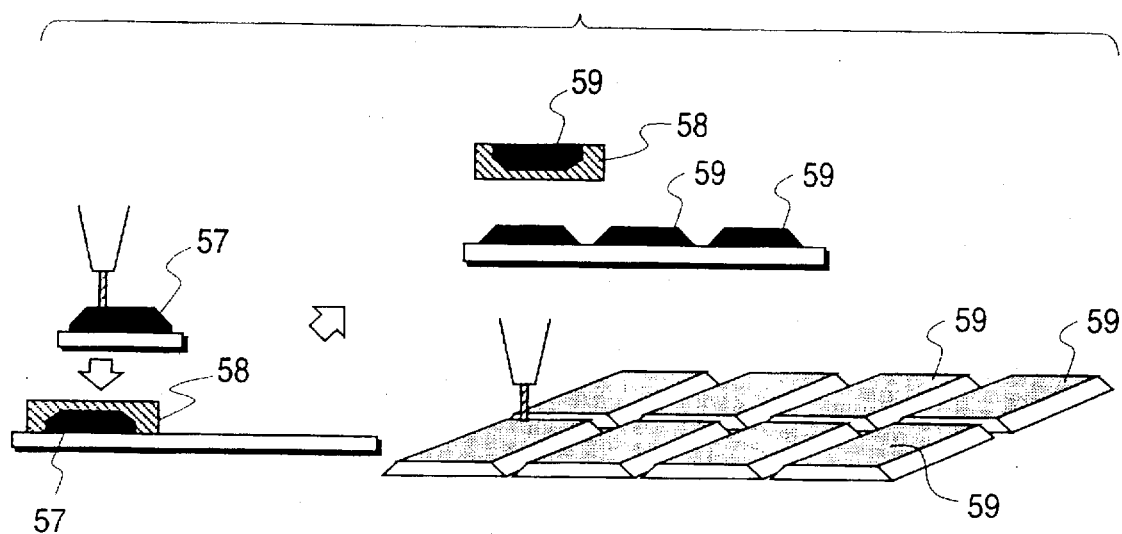
Figure 17:
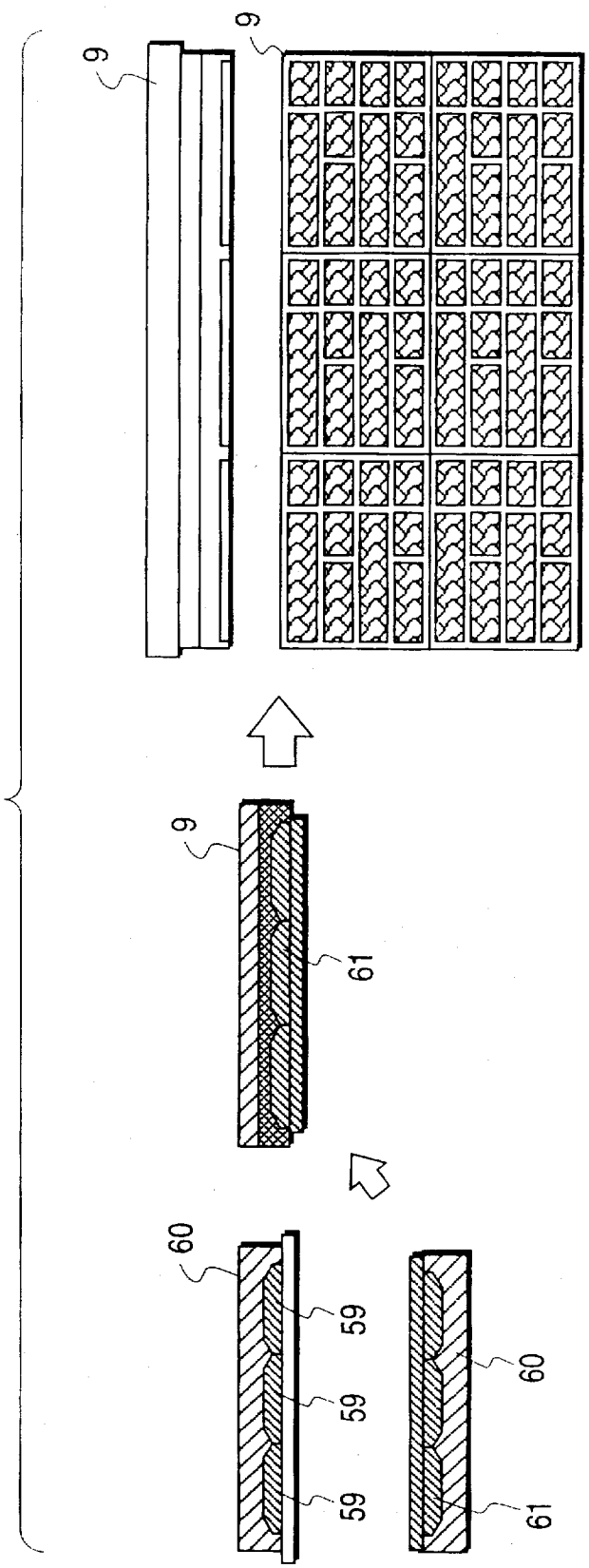

FIGS. 16 and 17 are explanatory diagrams for a description of the formation of a metal mold in a third embodiment of the invention.

Figure 18:
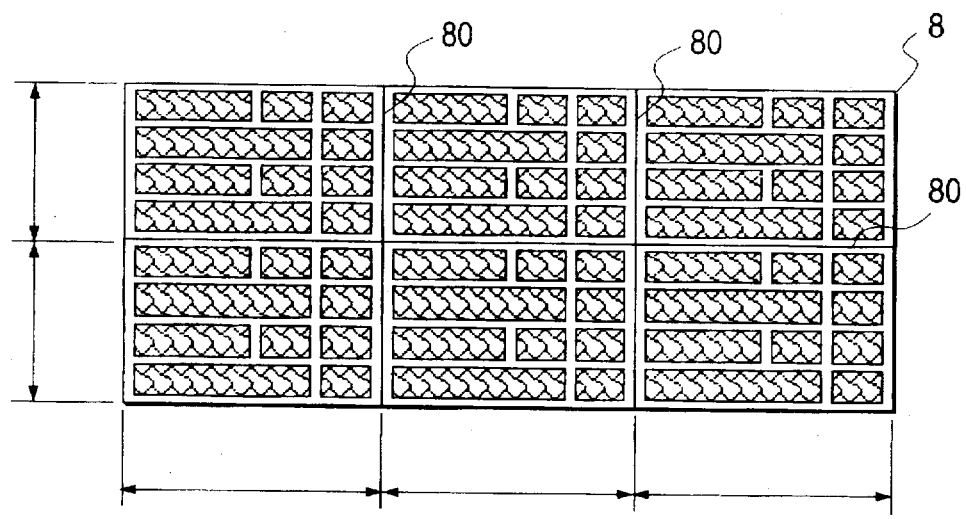

FIG. 18 is a front view of a building material formed according to the method of the invention.

Figure 19:
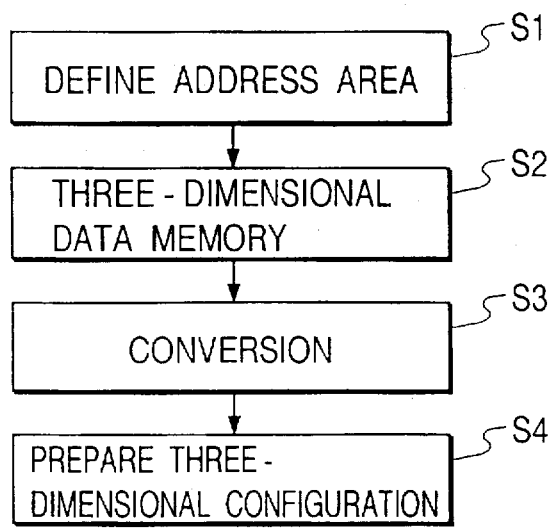
Figure 20:
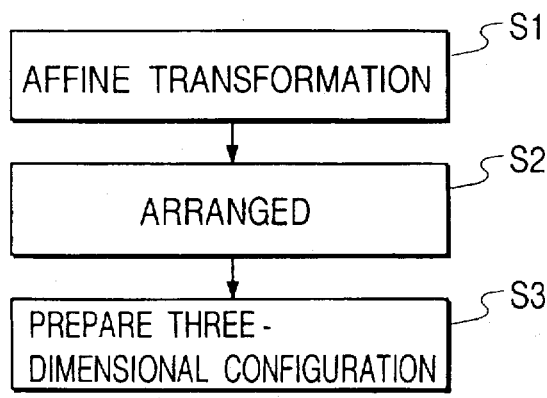

FIG. 19 is block diagrams for preparing three dimensional configuration;

FIG. 20 is a block diagram for explaining affine transformation.

Figure 21:
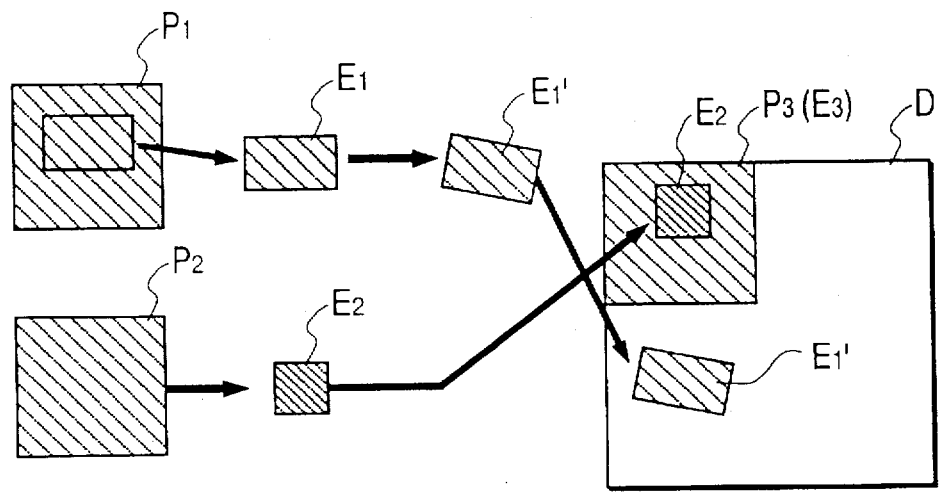
Figure 23:
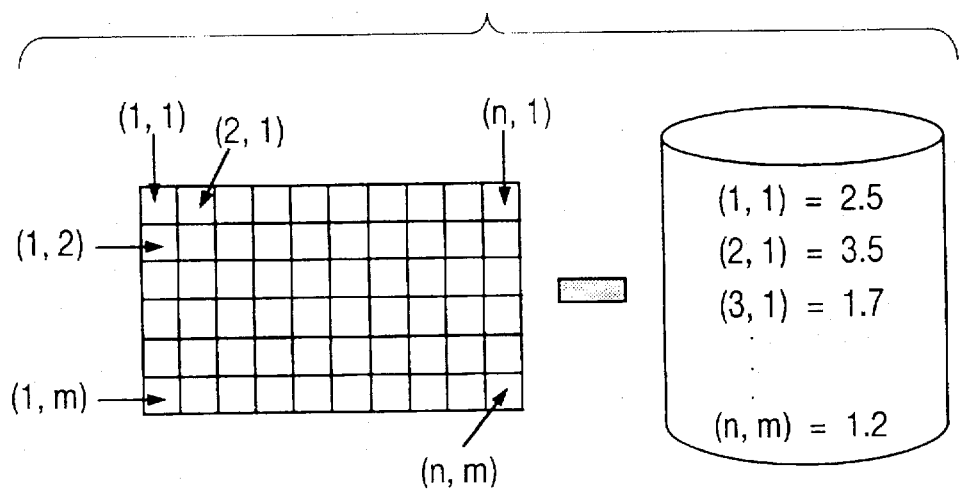

FIG. 21 is an explanatory diagram of FIG. 20;

FIG. 22 is an explanatory view of three-dimensional data measuring device;

FIG. 23 is an explanatory diagram of three-dimensional image data;

FIG. 24 (a) is an explanatory diagram for a description of how to take a piece out of a given image; and FIG. 24 (b) is an explanatory diagram for a description of the lay-out of the pieces.

DETAILED DESCRIPTION OF THE PREFERRED EMBODIMENTS

Figure 3:
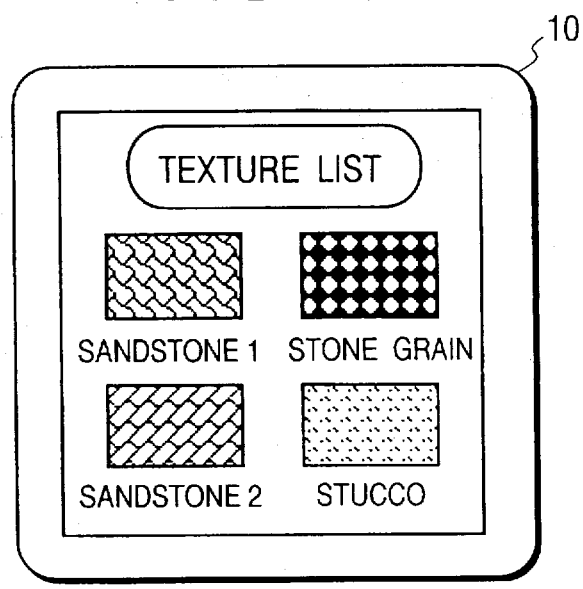
FIG. 3 is an explanatory diagram for a description of the evaluation of a texture in the method of the invention.

The invention will be described with reference to its preferred embodiments shown in the accompanying drawings. A greater part of a method of manufacturing a building material, which constitutes a first embodiment of the invention, is practiced at a work station where CAD image processing operations are carried out (step 101). In the method, first, a texture to be formed is determined with reference to pictures, sketches, articles, etc. In this case, the pictures, sketches, etc. are stored as digital data, so that they, as shown in FIG. 3, are displayed on the screen 10 of the work station 1 for examination. Hereinafter, in Figures, an image surrounded by the screen 10 means that this image is displayed on the work station 1 or the like.

After a texture to be formed has been determined, a thing or article having the texture is selected, and employed as a specimen 2 (step 102). That is, three-dimensional data on the surface pattern of the specimen 2 are obtained (step 103). This operation is carried out with the work station 1 equipped with an image pickup unit 3 which is able to obtain even height data, as shown in FIG. 4 (step 104). The three-dimensional data thus obtained are stored in a memory unit in the work station 1 (step 105). The image pickup unit 3 is not always limited to that which shown in FIG. 4; that is, a variety of image pickup units (3) may be employed for the work station 1.

According to two-dimensional data of the above-described three-dimensional data, a corresponding image is displayed on the screen 10 of the work station 1 (steps 106 and 107). The image thus displayed is processed (shaped or deformed) as follows. As shown in FIG. 5, a part of the image (hereinafter referred to as a piece 4) is cut out (step 108); and as shown in FIG. 6, the piece thus cut out; that is, the pattern is processed; i.e., enlarged or shrunk in the direction x and/or y; or as shown in FIG. 7 (step 109), the patterns thus processed are combined together to provide a variety of patterns (step 110). In addition, the height data of the aforementioned three-dimensional data concerning the pattern thus shaped are also subjected to enlargement and/or shrinkage as shown in FIG. 8 (steps 111 and 112). The resultant pattern is further subjected to edition and correction, so that it is displayed, as a three-dimensional graphic representation, on the screen 10 of the work station 1 as shown in FIG. 9 (steps 113 and 114) and is evaluated and examined (step 115).

In the present invention, evaluation and examination means that whether or not the texture being displayed is satisfied by a designer, a customer or the like in view of their own feeling, a desired pattern, a manufacturing condition or the like.

Even if there is no specimen (2) available for the selected texture, three-dimensional data can be obtained for it. For instance, two-dimensional data are obtained from pictures or the like, and then combined with height data from substitutes for it, to obtain the three-dimensional data. With respect to the form, edition and correction of the above-described two-dimensional data and height data, no algorithm is particularly limited for the operation of data.

Examples a method for processing the three-dimensional data are as follows.

The transformation applied to the design region (in FIG. 19) is carried out as shown, for instance, in FIG. 20. That is, first, affine transformation is applied to the design region (Step S1). The term "affine transformation" as used herein is intended to means that a design region taken out a three-dimensional data is freely transformed—for instance parallel-moved, turned, enlarged and shrunk—in a three-dimensional space. Next, the design region is arranged on a configuration which has the dimensions and configuration of a member to be newly formed (such as a building board in this invention) (Step S2). After the arrangement of the design region, the height is obtained from the sum of the height of a plane and the height of the design region (Step S3). Thus, the operator can cut or transform the design region until a desired configuration is obtained while watching the figure of the three-dimensional data displayed on the display unit and the figure of the three-dimensional data which is transformed, for instance subjected to affine transformation.

By way of example, let us consider the case of designing a plate material. When design regions having desired configurations are obtained in the above-described manner, those design regions are arranged at desired positions in a designing area of a figure having the dimensions and configuration of the plate material to be designed. In this case, it is not always be necessary that those design regions to be arranged in the designing area are equal in configuration; that is, when necessary, design regions different in configuration may be arranged in the designing area. And, the designing area is covered with the design regions. The above-described operation is as shown in FIG. 21. In the case of FIG. 21, a design region $E_1$ is taken out of a three-dimensional data $P_1$, and turned by affine transformation into a design region $E_1$, which is set in the designing area D, or a three-dimensional data $P_2$ is shrunk into a design region $E_2$, which is set in the design area D, or a three-dimensional data $P_3$ is set, as a design region $E_3$, in the designing area as it is. In this case, those design regions $E_1$, $E_2$ and $E_3$ may be overlapped with one another. The term "setting a design region" as used herein is intended to mean that the design region is moved to a desired position on the screen of the display unit and displayed there.

Further, a method for processing the three-dimensional data, specifically in a height data, are as follows.

Hence, in obtaining an image from a three-dimensional model specimen selected, as shown in FIG. 23 not only image data of two-dimensional coordinates are formed but also the measurement of the specimen in the direction of height is carried out; that is, the coordinate data in the direction of height are obtained. And the coordinate data in the direction of height are combined with the image data for every picture element, to obtain three-dimensional image data, which are stored, and the aforementioned image is formed according to the three-dimensional image data thus stored.

The coordinate data in the direction of height are formed as follows. For instance as shown in FIG. 25, a three-dimensional model specimen 201 is irradiated with slit light sources 202 which are variable in light projection angle θ, and its image is picked up with a television camera 203, the output of which is applied to an image encoder 204. And with respect to the image obtained through the image encoder 204, a configuration calculating circuit 205 carries out the following calculation:

$$f(x\ y) = z_0 - (x_0 - x) \tan(x,\ y)$$

The coordinate data in the direction of height formed according to the principle of trigonometric survey are combined with two-dimensional image data which add luminance data to picture elements existing in the range of measurement, to obtain three-dimensional image data. In this case, z value data is read out for every picture element, and the picture elements of the two-dimensional image data are linked with the picture elements of the data in the direction of height, to obtain three-dimensional image data as shown in FIG. 26.

In the case where a pattern is taken out or arranged, the above-described three-dimensional image data are called and displayed on the screen. Out of the image thus displayed, a part to be taken out is defined with input means such as a mouse as shown in FIG. 27 (a). And, as shown in FIG. 27 (b), the image part or parts thus defined and taken out are arranged on the screen; that is, a pattern arrangement (or lay-out) is determined.

If, in the pattern lay-out, the two-dimensional coordinate data or the coordinate data in the direction of height are made correctable, then the pattern contents can be changed as desired. Furthermore, if the three-dimensional image data of a plurality of three-dimensional model specimens different in kind are arranged in combination, then a variety of patterns can be freely obtained and reproduced.

After being laid out, the image data are assigned with colors, and the assignment is stored. Hence, a three-dimensional model can be formed as follows: That is, the three-dimensional image data thus stored are used to form machining data which are machining conditions added to the x, y, z coordinates.

The pieces 4 thus evaluated and examined are laid at predetermined positions on the screen 10 as shown in FIG. 10 (steps 116 and 117). In addition, as shown in FIG. 11, a part of the height data H which is larger than a predetermined value h1 is removed (step 118). And a miniature size model 5 in which a plurality of pieces 4 are arranged is displayed on the screen 10 of the work station 1 as shown in FIG. 10 (step 119). Under this condition, the model 5 is subjected to evaluation and examination (step 120). In this case, it should be noted that the model 5 corresponds to a region defined by the joints 80 of a building material 8 which is manufactured a final complete product as shown in FIG. 18. The removal of the part of the height is to provide flat regions in the surface of the building material manufactured, thereby to prevent the protrusions of building materials from damage when stacked. The above-described miniature size model 5 is made up of a plurality of pieces 4. A miniature size model may be made up of a plurality of pieces 4 different in kind. In this case, the plurality of pieces 4 different in kind are formed by repeatedly practicing the above-described method, and those pieces are called and laid out on the screen 10. Thus, the aimed miniature size model 5 has been formed.

After a miniature size model 5 has been determined through evaluation and examination, the models 5 are laid out on the screen 10 (step 121), to obtain a full size model 6 (122). Next, machining data such as described above, which are applied to a machining unit 7 such as a building material model forming NC machining unit, are formed according to the three-dimensional data of the full size model 6, so that the aimed building material model is formed with the machining unit 7 (step 123). The building material model thus formed is subjected to evaluation and examination (step 124). After the employment of the building material model has been determined, a full size metal mold is formed according to three-dimensional data corresponding to the building material model in the same method as the building material model has been formed (step 125). The metal mold thus formed is used to form the building material (step 126). The metal mold is a press molding one in the case where the building material is formed with a green sheet as its base. In the present invention the green sheet is produced, for example, by filtration. Thus, the green sheet of the present invention includes, for example, a fiber reinforced cement board.

Figure 1:
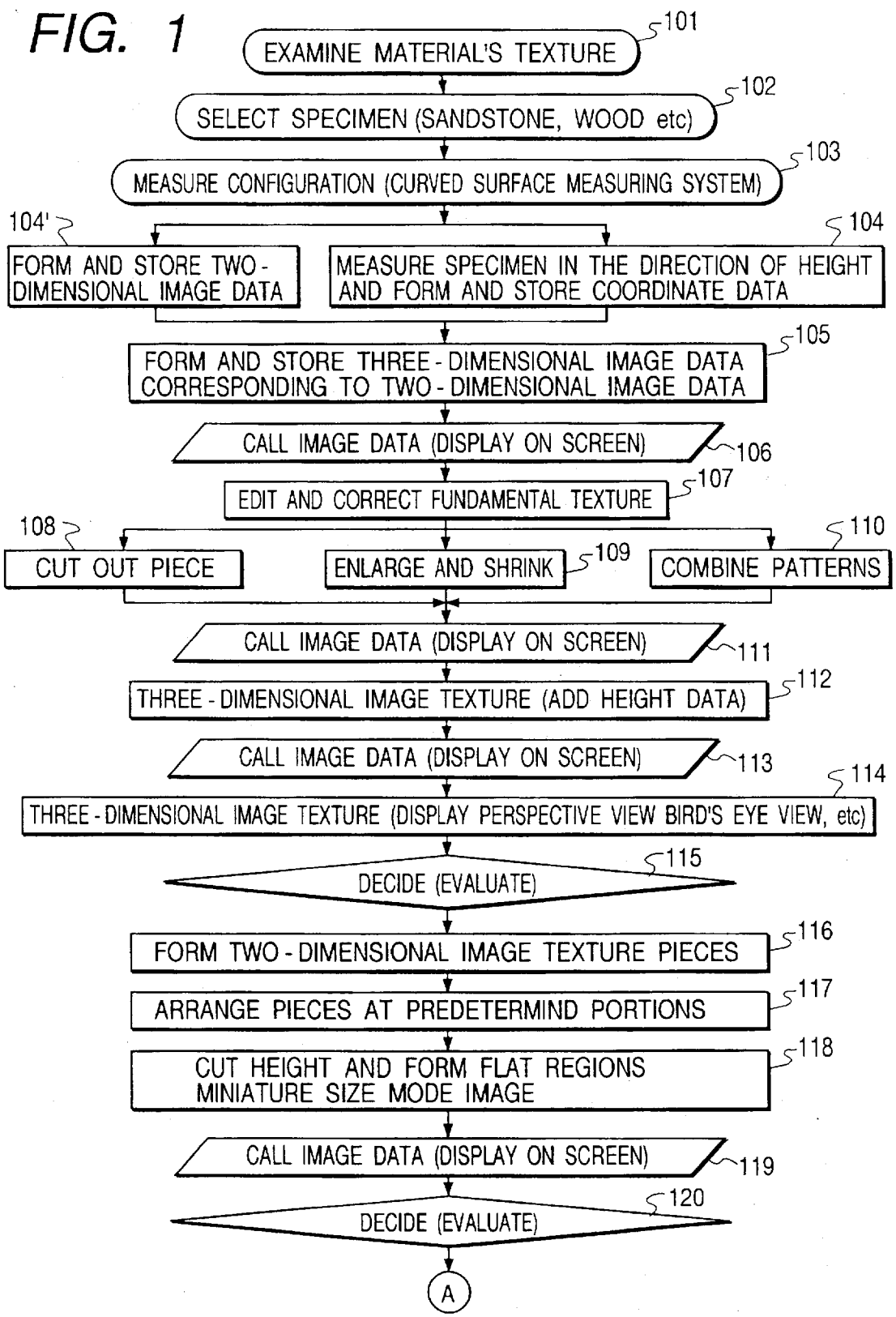
FIGS. 1 and 2 are two parts of a flow chart for a description of an example of a building material manufacturing method, which constitutes a first embodiment of the invention.
Figure 2:
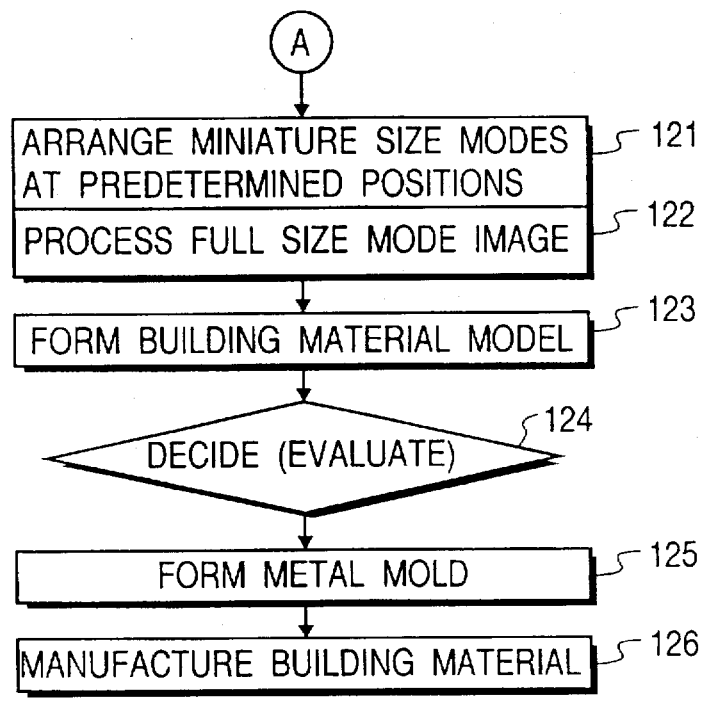

FIGS. 1 and 2 are two parts of a flow chart for the above-described manufacturing method.

Before the full size model 6 is formed after the formation of the miniature size model 5, a miniature size building material 50 may be formed according to three-dimensional data corresponding to the miniature size model so that the evaluation is carried out while watching the miniature size building material 50. In this case, the resultant evaluation is more effective and suitable. As for the evaluation, it is preferable that, in this case, the miniature size building material 50 is made of the same material as the building material aimed to be formed. Hence, as shown in FIG. 14, a model mold 51 is formed with the machining unit 7, and a resin mold 52 is formed by utilizing the model mold 51. With the resin mold 52 thus formed, the green sheet is press-molded into the miniature size building material 50.

The full size building material metal mold may be formed as follows: That is, a miniature metal mold 55 corresponding to the miniature size model which has been selected through evaluation is formed according to three-dimensional data corresponding to the miniature size model. A plurality of metal molds 55 thus formed are arranged according to the full size model, to obtain the aimed metal mold 9 corresponding to the building material. In the case of FIG. 15, the metal mold 9 is formed as follows: Discharge-machining graphite electrodes 56 are formed on an NC cutting machine according to the three-dimensional data of the miniature size model 5. A steel material is machined by discharging with the electrodes 56, to form a metal mold 55. A plurality of the metal molds thus formed are arranged as one unit, to provide the metal mold 9.

In addition, as shown in FIG. 16, the metal mold 9 may be formed as follows: First a transferring casting model 58 is formed: That is, a mold 57 which is formed by NC cutting according to three-dimensional data corresponding to the miniature size model which has been selected through evaluation, is subjected to transferring to form a transferring casting model 58. By using the casting model 58, a resin mold master 59 is formed. A plurality of the resin mold masters 59 thus formed are arranged, and machined to form joints. Next, as shown in FIG. 17, by using the masters 59, a casting model 60 is formed, and a model 61 is formed with the aid of the casting model 60. By using the model 61, the aimed metal mold is formed which corresponds to a full size model building material.

In the case where a three-dimensional model to be formed is not for evaluation, but a design original model for formation of a metal mold by transferring, first a machining dimension variation correcting value (coefficient) is obtained from a data base which is a collection of shrinkage data of casting material which is based on the hardening of the latter in the case where molding is performed with a formed metal mold. The machining data corrected with the value is utilized to drive the machining unit, to form the three-dimensional model. That is, in the case where the casting material is epoxy resin, and the aforementioned data base indicates the fact that the shrinkage percentage of the epoxy resin is 0.15%, in order to form a metal mold for molding epoxy resin, corrected values are used which are obtained by multiplying the pitches of value of the machining data by 1.0015 (1 +shrinkage percentage). A molding changes in dimension after formed. That is, the variations in dimension of the metal mold which may occur after it has been formed, are taken into consideration, which results in an improvement in machining accuracy.

In the formation of the above-described metal mold, too, by applying machining dimension variation correcting values (coefficients) such as those described above to the metal-mold machining data, the resultant data will be ones which are determined with dimensional variations taken into consideration which may occur after the metal mold is formed. This feature contributes to improvement of the machining accuracy.

As was described above, in manufacture of a full size metal mold 9, it may be considered that the full size building material is an assembly of miniature size models 5. Hence, in the case of manufacture of the metal mold 9 according to the data of the miniature size model 5, the manufacture of the full size building material may be achieved by successively arranging the miniature size building materials 50.

As was described above, in the method of the, at the CAD and CAM work station, the operator can push forward with the designing of an exterior or interior building materials having uneven surface patterns as well as the formation of manufacturing metal molds while watching the image of a building material to be formed. This feature makes it possible to form building materials which are closed in visual resemblance to the real ones.

Designing size is gradually increased in the order of "a piece", "a miniature size model" obtained by laying out the pieces, and "a full size model" obtained by laying out the miniature size models, and whenever the designing size is increased in the above-described manner, the surface pattern is evaluated and examined. Hence, the designing and formation of a building material having a desired texture can be performed with high efficiency.

If, in this connection, the external configuration and dimensions of the miniature size model is defined with the joints of the building materials, then it is possible to improve the work efficiency, and to suitably evaluate the resultant surface patterns thus designed.

A plurality of desired pieces can be obtained by repeating the evaluating step. And by laying out those pieces, a miniature size model can be formed. Hence, suitable building materials can be formed with ease.

In the case where a miniature size building material is formed according to three-dimensional data corresponding to a miniature size model which is evaluated, and is then subjected to evaluation, and then the sixth step is effected, the evaluation of the surface patterns can be carried out more effectively during designing.

On the other hand, a miniature size metal mold may be formed according to three-dimensional data corresponding to a miniature size model which is evaluated. In this case, a plurality of the miniature size metal molds thus formed are arranged according to a full size model, to obtain a building material metal mold. Alternatively, a miniature size casting model may be formed according to three-dimensional data corresponding to the miniature size model which is evaluated. In this case, the casting model is used to form a full size model casting model, and the full size model casting model is utilized to form a building material metal mold. As is apparent from the above description, in those cases, the amount of data to be handled is less, which make it possible to form the building material metal mold with ease.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of manufacturing a building material comprising:

(a) obtaining and storing three-dimensional data on a selected surface pattern;

(b) displaying on a screen a first image based on two-dimensional data of said three-dimensional data, and shaping said first image thus displayed;

(c) displaying on said screen a second image which is obtained by adding height data of said three-dimensional data to said first image thus shaped and evaluating said second image being displayed;

(d) arranging pieces cut on said screen from said second image which has been shaped and evaluated, at predetermined positions, to process a miniature size model image;

(e) displaying said miniature size model image on said screen and evaluating said miniature size model image being displayed;

(f) arranging said miniature size model image selected through evaluation at predetermined positions to process a full size model image;

(g) forming a building material model according to three-dimensional data of said full size model image and evaluating said building material model thus formed;

(h) and forming a mold according to three-dimensional data corresponding to said building material model; and (i) forming a building material by use of said mold.

2. A method of manufacturing a building material as claimed in claim 1, wherein an external configuration and size of said miniature size model image is defined by joints of building materials.

3. A method of manufacturing a building material as claimed in claim 1, wherein said step (b) and said step (c) are repeatedly carried out to obtain a plurality of desired pieces, and said pieces thus obtained are arranged to form said miniature size model image.

4. A method of manufacturing a building material as claimed in claim 1, further comprising the steps of:

(j) forming a miniature size building material according to three-dimensional data corresponding to said miniature size model image; and (k) evaluating said miniature size building material, wherein these steps are arranged between said step (e) and said step (f).

5. A method of manufacturing a building material as claimed in claim 1, the step (h) includes:

(l) forming a miniature size mold according to three-dimensional data corresponding to a miniature size model image which is evaluated in said step (e);

(m) forming a plurality of said miniature size molds; and (n) arranging a plurality of said miniature size molds according to a full size model to obtain a building material mold corresponding to said building material.

6. A method of manufacturing a building material as claimed in claim 1, further comprising:

(o) forming a miniature size casting model according to three-dimensional data corresponding to said miniature size model image which is evaluated in said step (e);

(p) forming a full size model casting model by using said miniature size casting model; and (q) forming a building material mold by utilizing said full size model casting model.

7. A method of manufacturing a building material as claimed in claim 1, further comprising:

(r) adjusting height data of one of said pieces, said miniature size model image and said full size model image arranged to a predetermined value to form flat regions in the surface of the building material.

* * * * *

UNITED STATES PATENT AND TRADEMARK OFFICE
CERTIFICATE OF CORRECTION

PATENT NO. : 5,744,081

DATED : April 28, 1998

INVENTOR(S) : Tanigawa, et al.

It is certified that error appears in the above-identified patent and that said Letters Patent is hereby corrected as shown below:

Column 9, line 19, delete "and".

Signed and Sealed this

Ninth Day of February, 1999

Attest:

*Attesting Officer*

*Acting Commissioner of Patents and Trademarks*